(12) United States Patent
Krieger et al.

(10) Patent No.: US 11,704,736 B1
(45) Date of Patent: *Jul. 18, 2023

(54) COMPUTERIZED PORTFOLIO MANAGEMENT TOOL

(71) Applicant: Wells Fargo Bank, N.A., San Francisco, CA (US)

(72) Inventors: Justin Morris Krieger, Saint Louis, MO (US); Sae Lee, Wildwood, MO (US); Zar John Toolan, St. Louis, MO (US); Gaurav Bhagat, Maryland Heights, MO (US); Sooyoung Moon Cho, Chesterfield, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 17/302,891

(22) Filed: May 14, 2021

Related U.S. Application Data

(63) Continuation of application No. 15/910,526, filed on Mar. 2, 2018, now Pat. No. 11,037,244.

(60) Provisional application No. 62/466,746, filed on Mar. 3, 2017.

(51) Int. Cl.
G06Q 40/06 (2012.01)
G06Q 40/04 (2012.01)

(52) U.S. Cl.
CPC ............ G06Q 40/06 (2013.01); G06Q 40/04 (2013.01)

(58) Field of Classification Search
CPC ........ G06Q 40/06; G06Q 40/04; G06Q 40/00; G06Q 10/10
See application file for complete search history.

(56) References Cited

U.S. PATENT DOCUMENTS

| | | |
|---|---|---|
| 6,021,397 A | 2/2000 | Jones et al. |
| 7,062,458 B2 | 6/2006 | Maggioncaida et al. |
| 7,216,099 B2 | 5/2007 | Chen et al. |
| 7,599,872 B2 | 10/2009 | Dundas et al. |

(Continued)

OTHER PUBLICATIONS

"U.S. Appl. No. 15/910,526, Non Final Office Action dated Aug. 26, 2020".

(Continued)

*Primary Examiner* — Hao Fu
(74) *Attorney, Agent, or Firm* — Schwegman Lundberg & Woessner, P.A.

(57) ABSTRACT

Various examples are directed to providing portfolio management tools. For example, a system may generate a portfolio management user interface comprising a first table and a first rebalancing button. The first table may comprise an asset class name column; a model portfolio column indicating asset class weights in a model portfolio; a test portfolio column indicating asset class weights in a test portfolio; a modification column indicating modifications to asset class weights; a modified portfolio column indicating asset class weights in a modified portfolio; and a plurality of rows comprising a first row for a first asset class of the asset classes and a second row for a second asset class of the asset classes. The system may receive an indication that the user selected the rebalancing button and generate a first set of modifications to asset class weights to reduce a difference between the test portfolio and the model portfolio.

20 Claims, 12 Drawing Sheets

(56) References Cited

U.S. PATENT DOCUMENTS

| | | | |
|---|---|---|---|
| 7,624,060 | B2 | 11/2009 | Michaud et al. |
| 7,668,773 | B1 | 2/2010 | Pruitt |
| 7,774,257 | B2 | 8/2010 | Maggioncaida et al. |
| 7,870,051 | B1 | 1/2011 | En et al. |
| 7,949,590 | B2 | 5/2011 | Strongin et al. |
| 8,275,688 | B2 | 9/2012 | Abidi et al. |
| 8,315,936 | B2 | 11/2012 | Stubbs et al. |
| 8,352,347 | B2 | 1/2013 | Howard et al. |
| 8,386,360 | B2 | 2/2013 | Abidi et al. |
| 8,478,675 | B1 | 7/2013 | Walia et al. |
| 8,533,089 | B1 | 9/2013 | Renshaw |
| 8,548,884 | B2 | 10/2013 | Meucci |
| 8,566,184 | B1 * | 10/2013 | Paluck ................ G06Q 40/06 705/30 |
| 8,732,050 | B2 | 5/2014 | Torre et al. |
| 8,751,359 | B2 | 6/2014 | Walia et al. |
| 2001/0051907 | A1 | 12/2001 | Kumar et al. |
| 2003/0120575 | A1 | 6/2003 | Wallman et al. |
| 2003/0126054 | A1 * | 7/2003 | Purcell, Jr. ............ G06Q 40/06 705/36 R |
| 2005/0049952 | A1 | 3/2005 | Carter |
| 2005/0108134 | A1 | 5/2005 | Harlow et al. |
| 2005/0154662 | A1 * | 7/2005 | Langenwalter ........ G06Q 40/00 705/37 |
| 2007/0208643 | A1 | 9/2007 | Gauthereon et al. |
| 2008/0243716 | A1 * | 10/2008 | Ouimet ................ G06Q 40/06 705/36 R |
| 2009/0271332 | A1 | 10/2009 | Lo et al. |
| 2012/0116994 | A1 | 5/2012 | Michaud et al. |
| 2012/0259797 | A1 * | 10/2012 | Sarkany ................ G06Q 40/06 705/36 R |
| 2013/0018818 | A1 | 1/2013 | Yadav |
| 2013/0198108 | A1 | 8/2013 | Walia et al. |
| 2013/0282623 | A1 | 10/2013 | Cracraft et al. |
| 2014/0289163 | A1 | 9/2014 | Michaud et al. |

OTHER PUBLICATIONS

"U.S. Appl. No. 15/910,526, Notice of Allowance dated Feb. 10, 2021".

"U.S. Appl. No. 15/910,526, Response filed Nov. 24, 2020 to Non Final Office Action dated Aug. 26, 2020", 19 pgs.

"Wealth Management Redesigned", [Online]. Retrieved from the Internet: <URL: https://www.personalcapital.com/wealth-management>, (Accessed Feb. 11, 2016), 10 pgs.

"Zephyr StyleADVISOR", [Online]. Retrieved from the Internet: <URL: http://www.informais.com/solutions/investment-analytics-and-reporting/zephyr-styleadvisor>, (2016), 2 pgs.

* cited by examiner

COMPUTERIZED PORTFOLIO MANAGEMENT TOOL

CROSS-REFERENCE TO RELATED APPLICATION

This patent application is a continuation of U.S. patent application Ser. No. 15/910,526, filed Mar. 2, 2018, which claims the benefit of U.S. Provisional Patent Application No. 62/466,746, filed Mar. 3, 2017, entitled "COMPUTERIZED PORTFOLIO MANAGEMENT TOOL", each of which are incorporated by reference herein in its entirety.

TECHNICAL FIELD

Embodiments described herein generally relate to systems and methods for implementing computerized tools for managing portfolios of securities.

BACKGROUND

Financial advisors manage portfolios of securities for clients with a goal of achieving positive results for the clients in view of the clients' risk tolerance.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which:

FIG. 5 is a screen shot showing another example of the screen of FIG. 4 with a recommended securities field displayed, for example, after the user has selected the recommended list button.

DETAILED DESCRIPTION

Various examples described herein are directed to systems and methods for implementing computerized tools to assist financial advisors in managing portfolios of financial assets. For example, a financial advisor may attempt to manage a portfolio to maximize the return while keeping the downside risk within a risk tolerance of the client (e.g., an owner or other entity with responsibility for the portfolio).

Portfolios may be made up of financial assets. Financial assets may include any type of security or other financial product including, for example, debt, equity, cash, money market shares, derivatives, managed funds, real estate interests, etc. Financial assets may be generally classified in terms of risk and expected returns. For example, an emerging market equities asset class may include financial assets (e.g., stocks) with high levels of expected return, but also high levels of risk. In contrast, a short-term, tax exempt, fixed income asset class may include financial assets (e.g., municipal bonds) with low levels of expected returns, but also low levels of risk.

A portfolio may be managed to achieve a desired expected return without exceeding a desired level of risk by balancing the portions of the portfolio that are held in financial assets of different asset classes. For example, a portfolio may be described by asset class weights. The asset class weights of a portfolio may describe the fractional portions of the value of a portfolio that are held in financial assets of different asset classes. For example, asset class weights may be expressed as percentages, fractional shares, or in any other suitable way.

In some examples, a financial advisor may manage a given portfolio with reference to an investment objective. An investment objective may describe a combination of desired returns and risk tolerance. In some examples, an investment objective may describe the highest expected return achievable for a given level of risk. Accordingly, it may be the goal of a financial advisor to manage the asset class weights of a portfolio to match the investment objective for the portfolio. For example, an investment objective for a given portfolio may be determined considering an evaluation of client goals and risk tolerance.

In various examples, a portfolio management system may generate portfolio management tools to assist financial advisers in managing portfolios to investment objectives and in selecting proper investment objectives for a portfolio. Portfolio management tools may be served to a user, for example, as components of a portfolio management user interface (UI).

Figure 1:
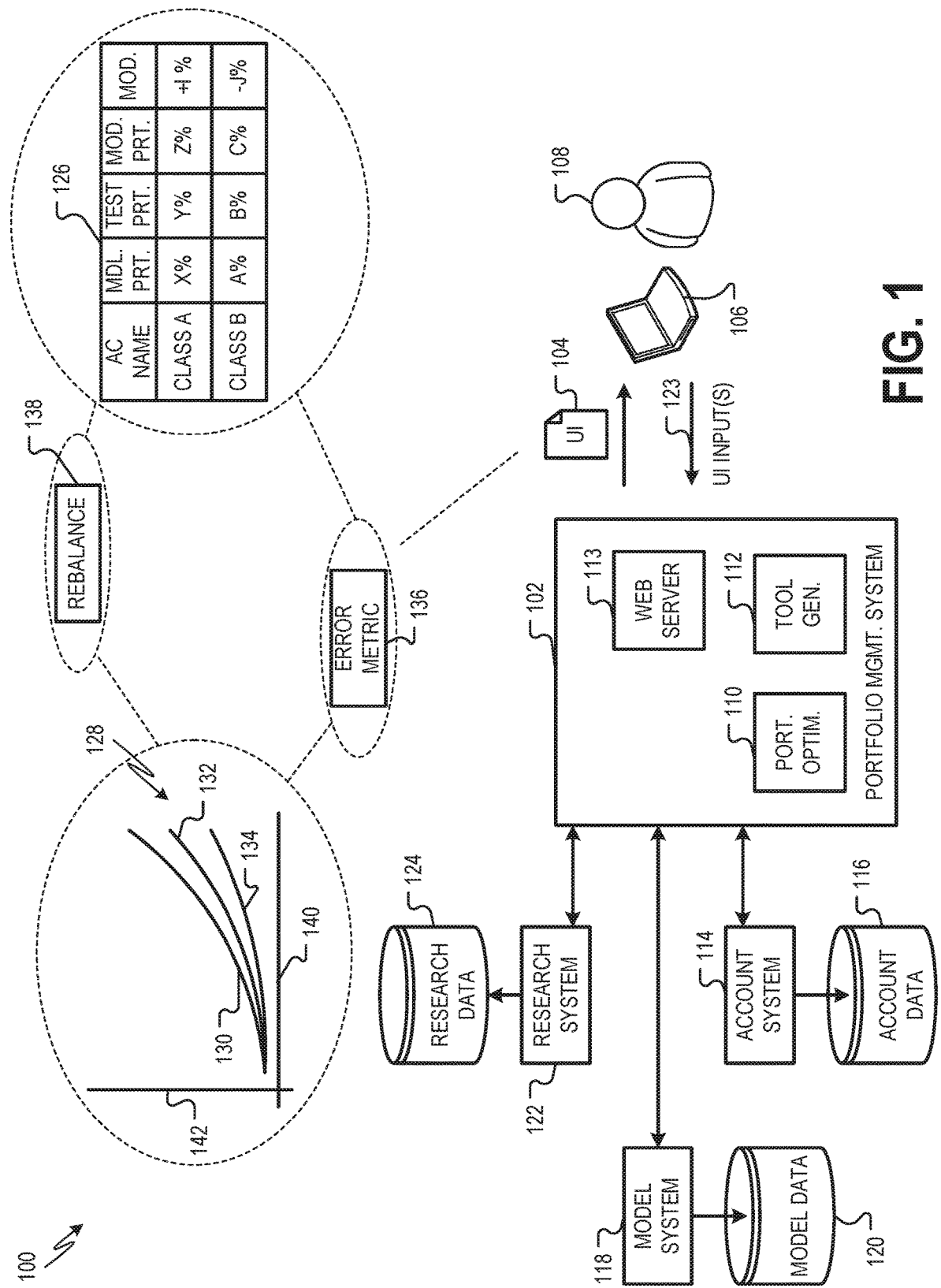
FIG. 1 is a diagram showing one example of an environment for implementing portfolio management tools.

FIG. 1 is a diagram showing one example of an environment 100 for implementing portfolio management tools. The environment 100 includes a portfolio management system 102 including a portfolio optimizer subsystem 110, a tool generator subsystem 112 and a web server 113. The portfolio management system 102 may generate and manage one or more portfolio management tools that may be provided to a user 108 via a portfolio management UI 104. The portfolio management UI 104 may be served to a user computing device 106 associated with a user 108. The user 108 may be, for example, a financial advisor or other suitable financial services professional. In some examples, the user 108 may be a client, portfolio owner, or other suitable party.

FIG. 1 shows several example portfolio management tools that may be provided to the user 108 via the portfolio management UI 104 either separately or in any suitable combination. For example, FIG. 1 shows an asset class table 126, a return plot 128, an error metric field 136, and a rebalance button 138. In some examples, the portfolio management tools 126, 128, 136, 138 may be tied to one another as indicated. For example, changes in one tool 126, 128, 136, 138 may be propagated to some or all of the other tools 126, 128, 136, 138. Other portfolio management tools are described herein and may be used in conjunction with those shown in FIG. 1.

The asset class table 126 includes rows and columns. Rows in the asset class table 126 may describe different asset classes. For example, the asset class table 126 includes two example rows. A first row, labeled CLASS A, corresponds to a first asset class, and a second row, labeled CLASS B, corresponds to a second asset class. Although only two rows are shown in FIG. 1, asset class tables 126 in various examples may have additional rows. The rows of the asset class table 126 may include various fields corresponding to the columns of the asset class table 126. Fields in the same column may have data of a similar type. The example asset class table 126 shows several example columns. An asset class name column, labeled AC NAME, includes fields indicating the name of an asset class. Fields in a model portfolio column, labeled MDL. PRT., may indicate asset class weights of a model portfolio. Fields in a test portfolio column, labeled TEST PRT., may include asset class weights of a test portfolio. Fields in a modified portfolio column, labeled MOD. PRT., may indicate asset weights for a modified portfolio. Fields in a modification column, labeled MOD., may indicate modifications to asset class weights. In the example of FIG. 1, rows of the asset class table are shown in a vertical orientation and columns are shown in a horizontal orientation. In other examples, the rows and columns may be organized in other various orientations.

The model portfolio may be an example portfolio reflecting a particular investment objective (e.g., a highest expected return that is achievable for a given level of risk). Asset class weights indicated in the model portfolio column may show the asset class weights that would generate the highest expected return for a selected level of risk. The test portfolio may be a portfolio of interest to the user 108, such as a portfolio managed by, owned by, or otherwise associated with the user 108. The modifications to asset class weights may be selected by the user 108 and/or generated by the portfolio management system 102, as described herein. The modified portfolio may be a result of applying the modifications to asset class weights indicated in the modification column to the test portfolio.

In the example shown in FIG. 1, the model portfolio has an asset class weight of X % in the asset class CLASS A, and an asset class weight of A % in the asset class CLASS B. The test portfolio has an asset class weight of Y % in the asset class CLASS A and an asset class weight of B % in the asset class CLASS B. The modification column shows a modification of +I % in the asset class CLASS A, and a modification of −J % in the asset class CLASS B. Accordingly, the modified portfolio may have an asset class weight of Z % in the asset class CLASS A and an asset class weight of C % in the asset class CLASS B, where Z % is (Y+I) % and C % is (B−J) %.

In various examples, the portfolio management system 102 may provide other portfolio management tools that, in conjunction with the asset class table 126, may provide functionality for rebalancing the test portfolio to more-closely match the model portfolio. For example, the portfolio management system 102 may also populate an error metric field 136 at the portfolio management UI 104. The error metric field 136 may describe a difference between the model portfolio and the test portfolio. Any suitable error metric may be used such as, for example, a tracking error. In some examples, a forecast tracking error may be displayed.

The portfolio management system 102 may also provide one or more rebalance buttons 138. When the user 108 selects the rebalance button 138, the portfolio management system 102 may generate one or more modifications to the test portfolio (e.g., modifications to asset class weights). The portfolio management system 102 may modify the portfolio management UI 104 to reflect the generated modifications in the modifications column MOD. and the modified portfolio column MOD. PRT. of the asset class table 126.

In some examples, modifications generated in response to the user 108 selecting the rebalance button 138 may be limited. For example, in some instances, it may be undesirable to execute a large number of trades from a portfolio, for example, to avoid excessive transaction fees and/or to prevent moving a market for a particular financial asset. In some examples, limited modifications generated in response to the user 108 selecting the rebalance button 138 may include one positive modification that increases the asset class weight of an asset class and one corresponding negative modification that decreases the asset class weight of another asset class. In some examples, the user 108 may select the rebalance button 138 one or more additional times to prompt the portfolio management system 102 to generate additional sets of corresponding positive and negative modifications. Also, in some examples, the user 108 may manually enter modifications into the modification column MOD. The portfolio management system 102 may propagate manually-entered modifications to the modified portfolio indicated at the modified portfolio column MOD PRT.

FIG. 1 also shows an example return plot 128 that may be included in the portfolio management UI 104. The return plot 128 may include two axes. A first axis 140 may indicate time, and a second axis 142 may show an indication of the size of a portfolio such as, for example, assets under management (AUM). The return plot 128 may include various curves corresponding to different portfolios. In the example of FIG. 1, the return plot 128 may display a first model curve 130 corresponding to a model portfolio. A test portfolio curve 134 may correspond to a test portfolio. A modified portfolio curve 132 may correspond to a modified portfolio. In some examples, the model portfolio, test portfolio, and modified portfolio corresponding to the curves 130, 134, 132 are the same as the portfolios described by the asset class table 126. For example, when the portfolio management system 102 receives and/or generates modifications to asset class weights, the portfolio management system 102 may modify the portfolio management UI 104 to propagate the changes in the modified portfolio curve 132. In some examples, the modified portfolio curve 132 may be omitted.

In some examples, the model curve 130 may be draggable by the user 108 to a different position on the return plot 128. This may assist the user 108 in selecting an appropriate investment objective for the test portfolio. As described above, the model portfolio described by the model curve 130 may represent an investment objective for the test portfolio, for example, the highest expected return for a given level of risk. The user 108 may select the model curve 130 and drag it to a new position on the return plot 128, for example, towards the test curve 134. The user 108 may drag the entire curve 130 and/or a particular point on the curve 130 (e.g., to a particular portfolio size at a particular time). In response to the dragging, the portfolio management system 102 may receive an indication of a size of the drag and a direction of the drag and/or a new position of the model curve 130 and/or a portion or portions of the model curve 130 that was dragged. The portfolio management system 102 may select a second model portfolio that matches the position where the user 108 dragged the model curve 130. For example, the second model portfolio may reflect a different investment objective than the first model portfolio. The portfolio management system 102 may modify the portfolio management UI 104 to re-position the model curve 130 to reflect the second model portfolio.

The portfolio management system 102 may be or include any suitable type of computing device or computing devices, such as, for example a laptop computer, a tablet computer, a server, etc. In some examples, the portfolio management system 102 may include multiple computing devices, at the same geographic location or at different geographic locations. For example, the portfolio optimizer subsystem 110, tool generator subsystem 112 and/or web server 113 may be implemented at separate computing devices.

The portfolio optimizer subsystem 110 may be programmed to generate modifications to a test portfolio (e.g., modifications to portfolio asset class weights). For example, the portfolio optimizer subsystem 110 may generate modifications to bring a test portfolio closer to a model portfolio. The tool generator subsystem 112 may be programmed to generate various portfolio management tools, as described herein. For example, the tool generator subsystem 112 may be programmed to generate the asset class table 126, the rebalance button 138, the error metric field 136, and/or the return plot 128, including modifications thereto. The tool generator subsystem 112, for example, may generate the portfolio management UI 104 including those tools and make modifications in response to UI inputs 123. The web server 113 may serve the portfolio management UI 104 to the user computing device 106 and, optionally, receive UI inputs 123 from the user 108 via the user computing device 106. UI inputs 123 may include, for example, selections of the rebalance button 138, manually-entered modifications to the test portfolio, dragging of the model curve 130, etc.

The portfolio management system 102 may be in communication with one or more other systems in conjunction with generating portfolio management tools. An account system 114 may comprise an account data store 116 including data describing one or more accounts such as accounts held by customers or clients of financial services providers. The account system 114 may be or include any suitable computing device or computing devices. The account system 114 may provide the portfolio management system 102 with account data describing one or more accounts. Account data may include, for example, portfolio data describing the financial assets held as part of a portfolio or portfolios of the account. Account data may also include, for example, data describing a client or other holder of the account (e.g., account holder). Data describing an account holder may include, for example, biographical data describing the account holder, data describing a risk tolerance of the account holder, data describing one or more financial goals of the account holder, etc.

A model system 118 may generate and/or store data describing one or more model portfolios that may be incorporated into the portfolio management UI 104, for example, as described herein. The model system 118 may be or include any suitable computing device or devices. The model system 118 may include or be in communication with a model data store 120, which may store model portfolios, and/or data for generating model portfolios. In some examples, a model portfolio may be generated in view of Capital Market Assumptions (CMA). CMA may, for example, represent estimates of the expected return, risk level, correlation to other asset classes, etc., of an asset class. In some examples, the model system 118 and/or portfolio management system 102 may be programmed to generate one or more model portfolios from the CMA. For example, the model system 118 and/or portfolio management system 102 may be programmed to generate combinations of asset classes (e.g., described by asset class weights) that generate the highest returns that will still meeting the risk tolerance level of a given investment objective.

A research system 122 may generate and/or store financial asset research data. For example, the research system 122 may include and/or be in communication with a research data store 124 including financial asset research data. Financial asset research data may be used, as described herein, to aid the user 108 in selecting specific assets to purchase and/or sell from the test portfolio to implement the modifications generated and/or described herein. The research system 122 may provide financial asset research data to the portfolio management system 102, as described herein.

Figure 2:
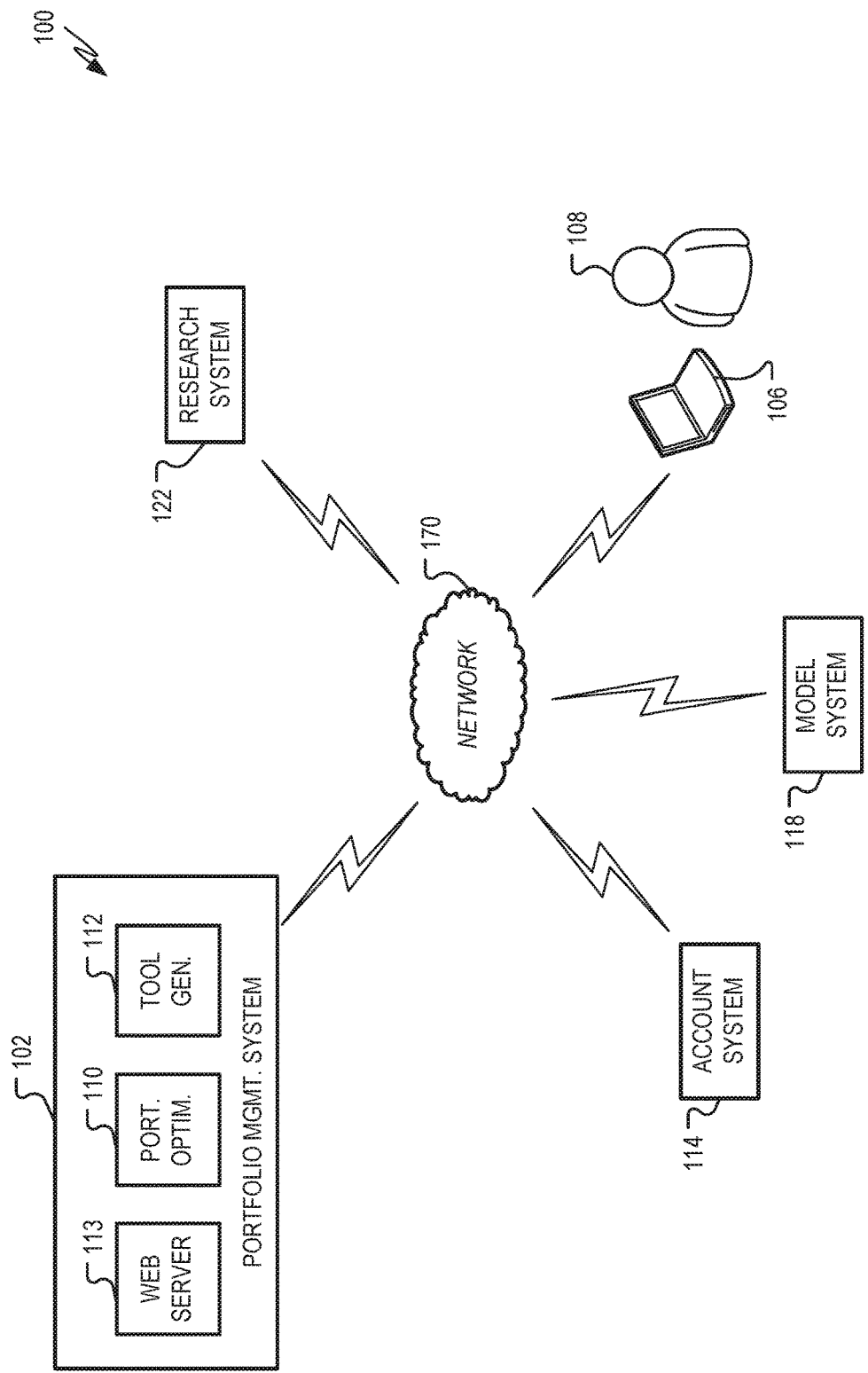
FIG. 2 is a diagram showing additional details of one example of the environment of FIG. 1.

FIG. 2 is a diagram showing additional details of one example of the environment 100. FIG. 2 shows the portfolio management system 102, the user computing device 106 and user 108, the account system 114, the model system 118, and the research system 122.

The various components of the environment 100 may be in communication with one another via a network 170. The network 170 may be or comprise any suitable network element operated according to any suitable network protocol. For example, one or more portions of network 170 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 3:
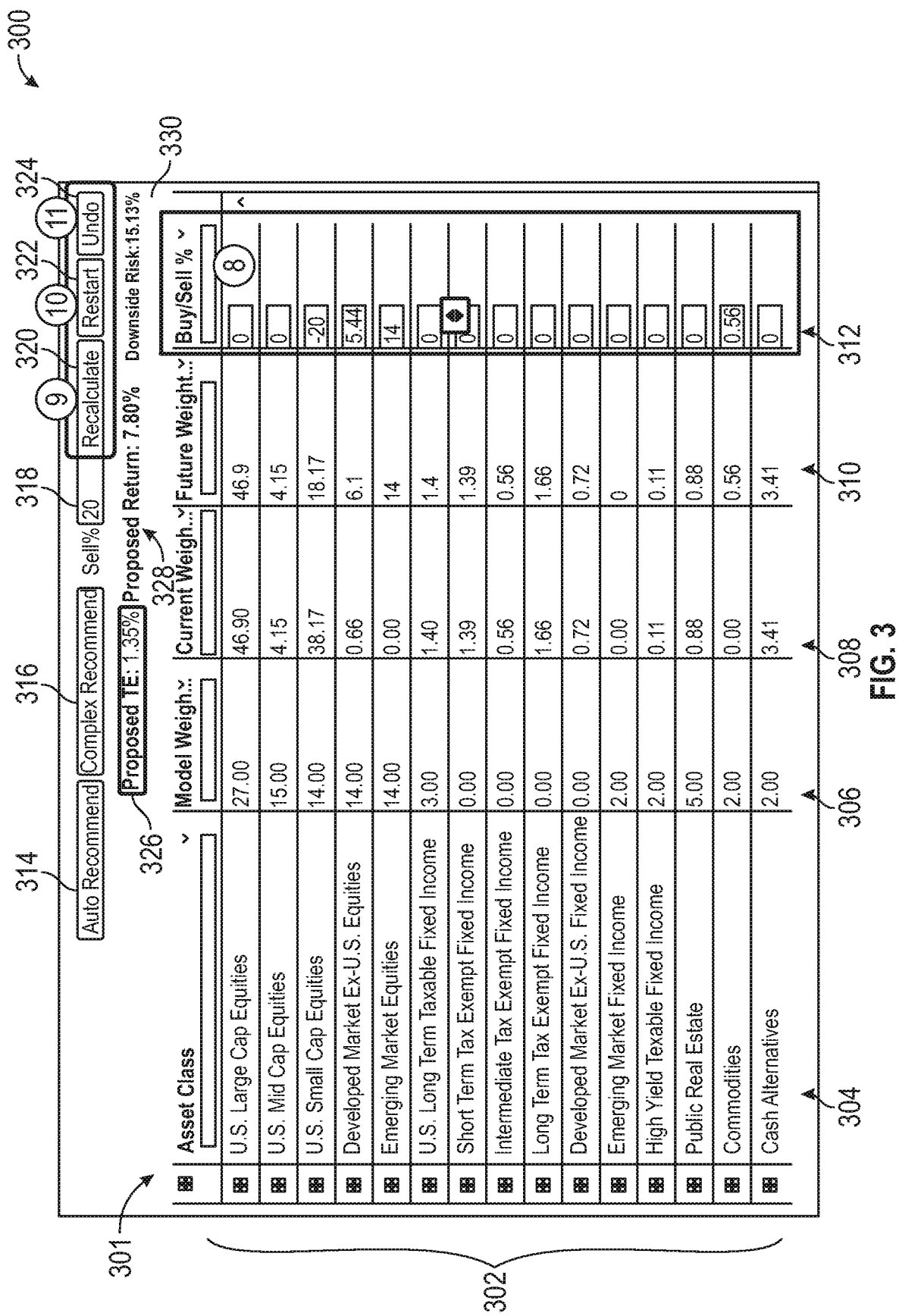
FIG. 3 is a screen shot showing an example screen that may be all or a portion of the portfolio user interface and may include various portfolio management tools.

FIG. 3 is a screen shot showing an example screen 300 that may be all or a portion of the portfolio user interface 104 and may include various portfolio management tools. For example, the screen 300 includes an example asset class table 301 including rows 302 and various columns including an asset name column 304, a model portfolio column 306, a test portfolio column 308 (labeled Current Weight in FIG. 3), a modified portfolio column 310 (labeled Future Weight), and a modification column 312 (labeled Buy/Sell %). The rows 302 indicate different financial asset classes, similar to the rows of the example asset class table 126.

The screen 300 also shows two rebalance buttons 314, 316. In various examples, the rebalance buttons 314, 316, when selected, may prompt the portfolio management system 102 to generate sets of modifications bringing the test portfolio closer to the model portfolio. In some examples, when selected, the rebalance buttons 314, 316 may prompt the portfolio management system 102 to generate sets of modifications according to different input parameters. For example, the first rebalance button 314, labeled Auto Recommend, may be selected by the user to prompt the portfolio management system 102 to generate a set of modifications including sales from a single asset class and offsetting purchases in another asset classes.

The second rebalance button 316, labeled Complex Recommend, may prompt the portfolio management system 102 to generate a set of modifications according to a user-received rebalancing parameter. For example, the screen 300 also includes a rebalancing parameter field 318 for receiving a rebalancing parameter from the user 108. For example, in the Example of FIG. 3, the rebalancing parameter field 318 receives a maximum sell percentage indicating a maximum percentage of portfolio to be sold by the generated set of modifications. For example, when the user 108 selects the rebalance button 316, the portfolio management system 102 may generate a set of modifications that call for selling no more than the percentage of the portfolio indicated (e.g., entered by the user 108) at the rebalancing parameter field 318. In some examples, the user 108 may select the rebalance button 314 a second time to generate an additional set of modifications, for example, including sales and/or purchases from additional asset classes. In some examples, the user 108 may select the rebalance button 316 a second time to generate an additional set of modifications including a sale from one asset class and offsetting purchases in one or more other asset classes.

In the example of FIG. 3, the user has selected the rebalance button 316 with the maximum percentage of the portfolio to be sold set at 20%. The example resulting modifications are displayed. For example, referring to the modification column 312, the asset class table 301 shows the asset class "U.S. Small Cap Equities" with an indicated modification of –20%, the asset class "Developed Market Ex-U.S. Equities" with an indicated modification of +5.44%, the asset class "Emerging Market Equities" with an indicated modification of +14%, and the asset class "Commodities" with an indicated modification of –+0.56%. The total sum of the modifications is zero.

The screen 300 also shows various other portfolio management tools, such as, for example, a modified error metric field 326, a proposed return field 328, a downside risk field 330. The modified error metric field 326 may show a proposed error metric indicating a difference between the modified portfolio and the model portfolio. For example, the error metric indicated at the modified error metric field 326 may be smaller than an error metric describing a difference between the test portfolio and the model portfolio. The proposed return field 328 may indicate an expected return of the modified portfolio, and the downside risk field 330 may indicate a downside risk metric describing a downside risk of the modified portfolio.

Other portfolio management tools shown in FIG. 3 include a recalculate button 320, a restart button 322, and an undo button 324. The recalculate button 320 may be selected by the user 108, for example, when the user 108 has manually entered or changed a set of modifications at the asset class table 301. For example, when the user 108 selects the recalculate button 320, it may prompt the portfolio management system 102 to recalculate and update various metrics displayed at the screen 300 such as, for example, at the error metric field 326, the proposed return field 328, the downside risk field 330, etc. When the user 108 selects the restart button 322, it may prompt the portfolio management system 102 to cancel any modifications made in the screen 300 and return assets weights of the modified portfolio to the original asset weights of the test portfolio. When the user 108 selects the undo button 324, it may prompt the portfolio management system 102 to undo the last modification or set of modifications that were applied at the screen 300.

Figure 4:
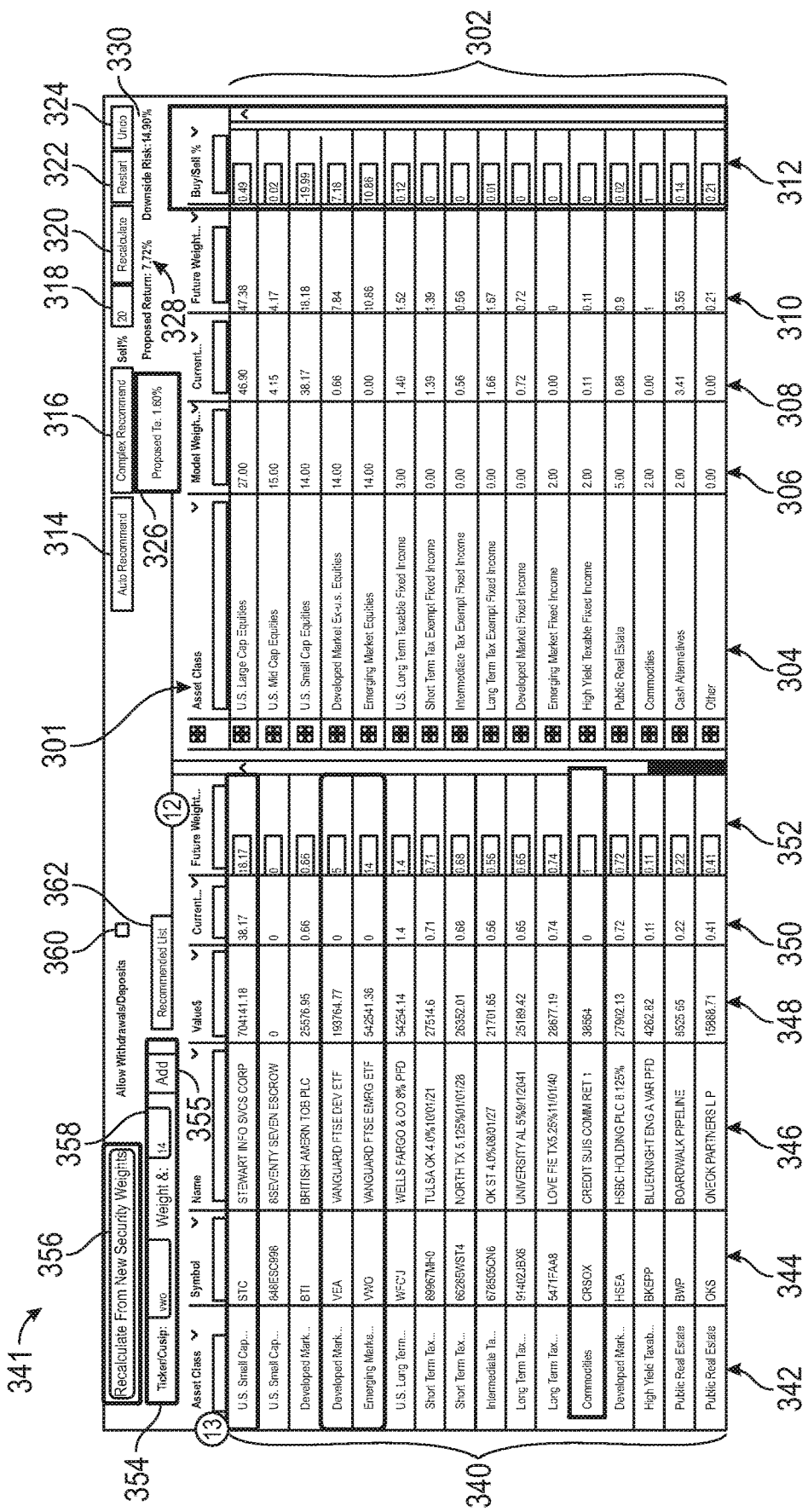
FIG. 4 is a screen shot showing another example of the screen of FIG. 3 showing an asset table in addition to the asset class table shown in FIG. 3.

FIG. 4 is a screen shot showing another example of the screen 300 showing an asset table 341 in addition to the asset class table 301. The screen 300, in the configuration shown in FIG. 3, for example, may make up some or all of the portfolio user interface 104 and may include various portfolio management tools.

The asset table 341 shown in FIG. 4 includes rows 340, where each of the rows 340 corresponds to a financial asset. An asset class column 342 may indicate the asset class of assets indicated by the various rows 340. A symbol column 344 may indicate a ticker or other symbol of the assets. An asset name column 346 may indicate the names of the assets. An asset value column 348 may indicate the value of shares or other examples of the assets in the portfolio. A test portfolio column 350 may indicate asset weights for the assets in the test portfolio. A modification portfolio column 352 may indicate the asset weights for the assets in the modified portfolio.

In some examples, an asset described by a row 340 may fall into more than one asset class. In these examples, the asset class column 342 may include multiple asset classes and/or may indicate a primary asset class for the asset. A primary asset class may indicate the asset class to which a majority and/or plurality of an asset belong.

In some examples, the user 108 may view the modifications sets displayed at the asset class table 301 and implement the modifications with trades using the asset table 341. For example, the user 108 may modify the entries at the future weight column in accordance with the modification set. In some examples, it may not be possible or desirable to implement a modification set exactly. For example, if a financial asset that the user 108 would like to buy or sell is not completely in a particular asset class, buying or selling that asset may result in changes to the asset class weights that are slightly different than a modification set.

The screen 300 at FIG. 4 also includes portfolio management tools for adding a financial asset to the modified portfolio. For example, an asset identifier field 354, labeled Ticker/CUSIP, may receive an indicator of the financial asset, such as a ticker, name, Committee on Uniform Securities identification Procedures (CUSIP) indicator, etc. A weight field 358 may indicate an asset weight for the financial asset to be added. An add button 355 may be selected to add the indicated financial asset to the modified portfolio.

Figure 5:
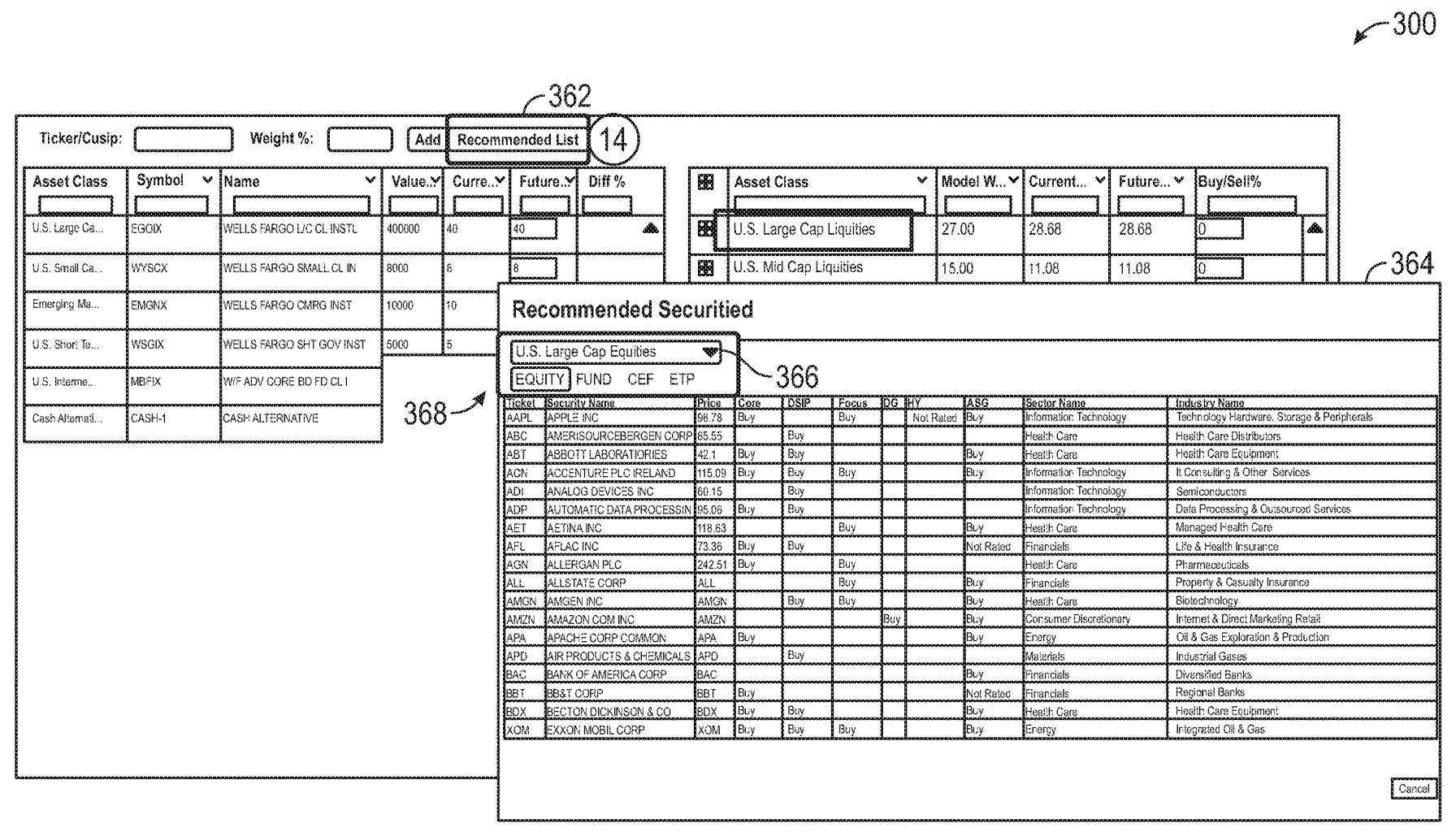

A recommended list button 362, when selected, may prompt the portfolio management system 102 to display indications of financial assets that are recommended for adding to the test portfolio. For example, FIG. 5 is a screen shot showing another example of the screen 300 with a recommended securities field 364 displayed, for example, after the user 108 has selected the recommended list button 362. The recommended securities field 364 may include a list of financial assets that the user 108 may select to add to the test portfolio. An asset class menu 366 may allow the user to select the asset class and/or dominant asset class of the financial assets displayed at the recommended securities field 364. The recommended securities field 364 may also include asset types tabs 368. The user 108 may select an asset type tab 368 to configure the portfolio management system 102 to display at the recommended securities field 364 financial assets of the selected type.

In some examples, the portfolio management system 102 may populate the recommended securities field 364 based at least in part on research data received from the research system 122. For example, the research data may indicate securities, and buy or sell ratings from one or more research entities.

Referring back to FIG. 4, a recalculate button 356 (labeled Recalculate From New Security Weights) may be provided to prompt the portfolio management system 102 to recalculate security and/or asset class weights, for example, in response to a manual change entered at the asset table 341 or asset class table 301. For example, when the user 108 makes a change to the asset weights of the modified portfolio at column 352, the user 108 may select the recalculate button 356. In response, the portfolio management system 102 may generate new asset class weights at the asset class table 301 and/or update various other fields including metrics describing the modified portfolio, such as the fields 326, 328, 330. An allow withdrawals/deposits button 360, when selected by the user 108, may permit the user 108 to eliminate and/or add financial assets from the test portfolio without making corresponding opposite transactions. For example, if the allow withdrawals/deposits button 360 is selected, the portfolio management system 102 may allow sets of modifications that do not cancel (e.g., sets of modifications where the sum of purchases and sales is either positive or negative).

Figure 6:
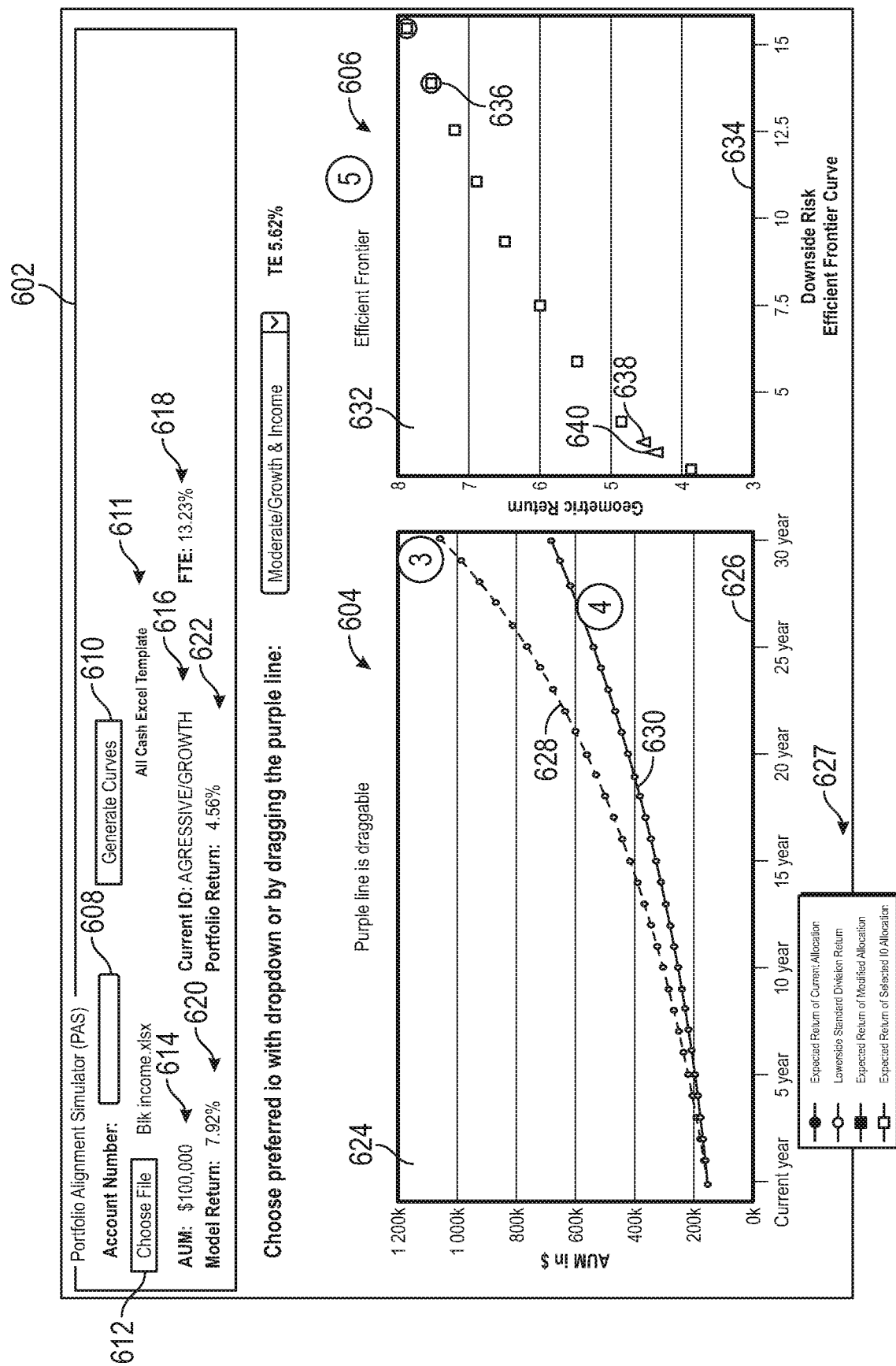
FIG. 6 is a screen shot showing one example of a screen that may be all or a portion of the portfolio user interface and may include various portfolio management tools.

FIG. 6 is a screen shot showing one example of a screen 600 that may be all or a portion of the portfolio user interface and may include various portfolio management tools. The screen 600 includes a configuration field 602 comprising various portfolio management tools including, for example, test portfolio loading fields/buttons 608, 610, 611, 612, a generate curves button 610, and metric fields 614, 616, 618, 620, 622.

Test portfolio loading fields/buttons 608, 610, 611, 612 may include an account number field 608. For example, the user 108 may enter one or more account numbers at the account number field 608. For example, an account number entered into field 608 may correspond to a portfolio owned, managed, or otherwise associated with the user 108. In some examples where the user enters an account number at the account number field 608, the portfolio corresponding to that account may become the test portfolio for the portfolio management tools described herein. A choose file field 612 may, when selected, enable the user 108 to enter a portfolio description. The portfolio description may be in any suitable format such as, for example, a Microsoft Excel®, eXtensible Markup Language (XML) or other suitable format. When a portfolio description is entered at field 612, the described portfolio may be the test portfolio for the purpose of the portfolio management tools described herein.

An optional all cash template button 611 may enable the user 108 to start with a test portfolio that initially includes a predetermined set of assets. In some examples, the predetermined set of assets may include all cash, all money market shares, a mix of cash and money market shares, etc. In this way, the user may begin from the predetermined set of assets and generate a portfolio, for example, by determining (or having the portfolio management system 102 determine) sets of modifications to match the test portfolio to one or more investment objectives.

The user may select the generate curves button 610 when a test portfolio has been selected. In response to the selection of the generate curves button 610, the portfolio management system 102 may populate portfolio management tools such as the return field or plot 604, an efficient frontier plot 606, etc. In some examples where the portfolio management system 102 also includes one or more of an asset class table 126, 301, an asset table 341, or other similar tool, these too may be populated when the generate curves button 610 is selected.

Metric fields 614, 616, 618, 620, 622 may also be populated upon selection of a test portfolio. For example, an assets under management (AUM) field 614 may indicate a current size of the test portfolio. A current 10 field 616 may indicate a current investment objective associated with the test portfolio. In some examples, the investment objective of the test portfolio may be received when the test portfolio is identified. For example, an account number entered at account number field 608 may have an associated investment objective stored, for example, at the account system 114. In other examples, the portfolio management system 102 may generate an investment objective for the test portfolio, for example, by selecting a predetermined investment objective that most closely matches the test portfolio. As described herein, the model portfolio may be based on the investment objective for the test portfolio.

An error metric field 618 may indicate a forecast tracking error or other indicator of a difference between the test portfolio and the model portfolio. A model return field 620 may indicate the return of the model portfolio. A test portfolio return field 622 may indicate the return of the rest portfolio.

The screen 600 also includes an example return plot 604. Similar to the return plot 128 described above, the return plot 604 may include two axes 624, 626. A first axis 626 may indicate time and a second axis 624 may show an indication of the size of the portfolios such as, for example, an AUM of the portfolios. The screen 600 shows a model portfolio curve 628 and a modified portfolio curve 630. (In this example, a test portfolio curve may be omitted or may be plotted, but obscured by modified portfolio curve 630.) The screen 600 also includes a curve selection field 627 from which the user 108 may select various curves to be plotted at the return plot 604. In the example of FIG. 6, the curve selection field 627 includes fields for selecting/activating the model portfolio curve 628, the test portfolio curve, and the modified portfolio curve 630. The curve selection field 627 also shows a selection for a downside curve. The downside curve may show a curve indicating the downside size of the test portfolio. For example, the downside curve may indicate the expected return on the test portfolio minus one standard deviation, where the standard deviation is determined based on the expected volatility or risk of the test portfolio.

In some examples, as described herein, the model portfolio curve 628 may be draggable by the user 108 to a new position on the return plot 604. When the user 108 drags the model portfolio curve 628, the portfolio management system 102 may select a new model portfolio, for example, as described herein. The various metric fields 614, 616, 618, 620, 622, etc., may be repopulated to reflect the new model portfolio.

The screen 600 also shows an example efficient frontier plot 606. The efficient frontier plot 606 may also include two axes 632, 634. A first axis 634 may indicate downside risk while a second axis 632 may indicate portfolio returns. For example, the efficient frontier may indicate the highest achievable return (axis 632) for a given level of risk (axis 634). The efficient frontier plot 606 includes a number of markers indicating the risk and return of different portfolios. Different indicator shapes or other visual properties, in some examples, may indicate different types of portfolios. For example, in FIG. 6. square indicators may represent model portfolios corresponding to different investment objectives and triangular indicators may correspond to test portfolios or modified portfolios. The square indicators representing model portfolios for different investment objectives may show a curve representing the efficient frontier. For example, in FIG. 6, the square indicator 636 may correspond to the model portfolio of the currently-selected investment objective. Triangular indicator 638 may correspond to the current test portfolio and triangular indicator 640 may correspond to the modified portfolio.

Figure 7:
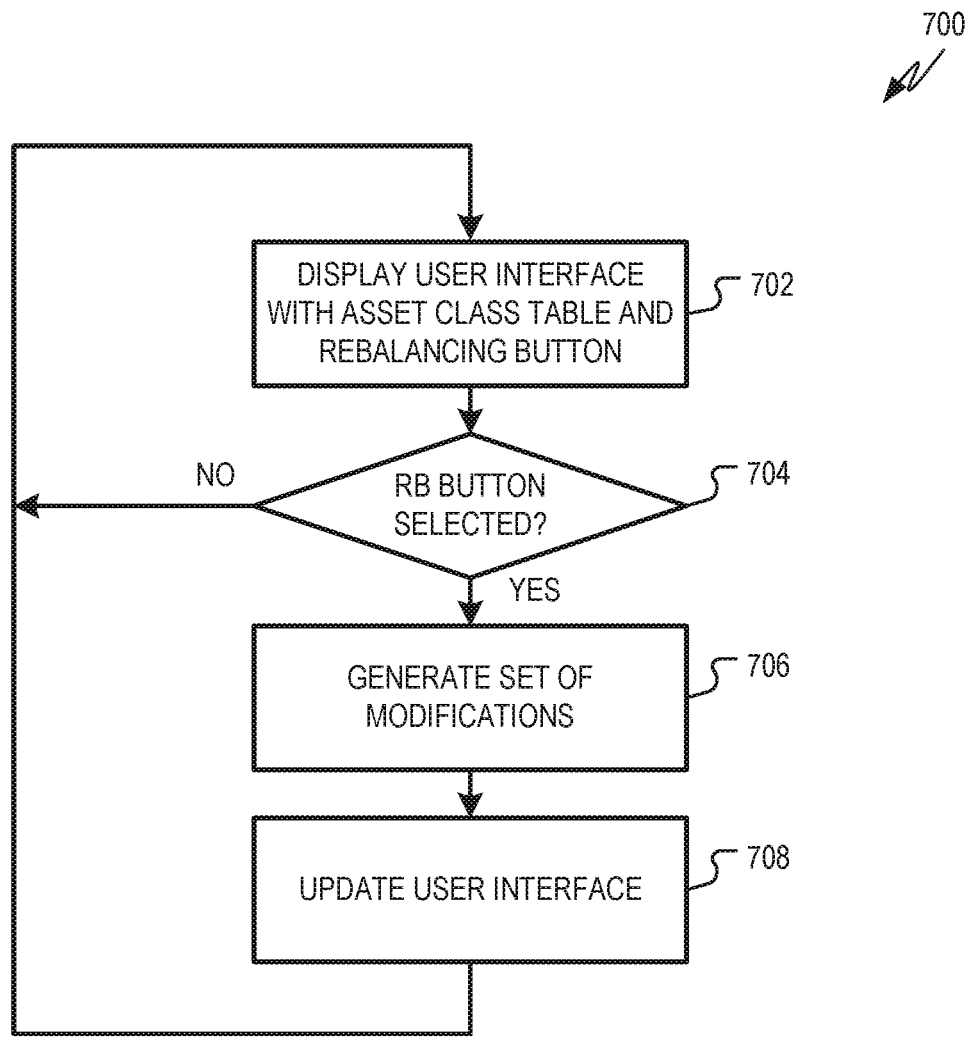
FIG. 7 is a flow chart showing one example of a process flow that may be executed by the portfolio management system to generate the portfolio management interface including various portfolio management tools.

FIG. 7 is a flow chart showing one example of a process flow 700 that may be executed by the portfolio management system 102 to generate the portfolio management UT 104 including various portfolio management tools. At operation 702, the portfolio management system 102 may generate and display the portfolio management UI 104, for example, with an example of the asset class table (e.g., such as 126 or 301 described herein) along with a rebalance button (e.g., such as 138 or 314 described herein). At operation 704, the portfolio management system 102 may determine if user 108 has selected the rebalance button. If not, the portfolio management system 102 may continue to display the portfolio management UT 104 at operation 702.

If the user 108 selects the rebalance button, the portfolio management system 102 (e.g., the portfolio optimizer subsystem 110) may generate a set of modifications, at operation 706, that may be applied to the test portfolio to generate the modified portfolio. In some examples, the portfolio management system 102 may generate the set of modifications subject to one or more parameters, as described herein. At operation 708, the portfolio management system 102 (e.g., the tool generator subsystem 112 and/or web server 113) may update the portfolio user interface 104 to reflect the set of modifications, for example, as described herein, and may then continue to display the portfolio management UI 104 at operation 702. If the user 108 selects the rebalance button a subsequent time at operation 704, the portfolio management system 102 may generate an additional set of modifications at operation 706 and modify the portfolio management UI 104 to reflect the subsequent set of modifications (and, optionally, previous modifications) at operation 708.

Figure 8:
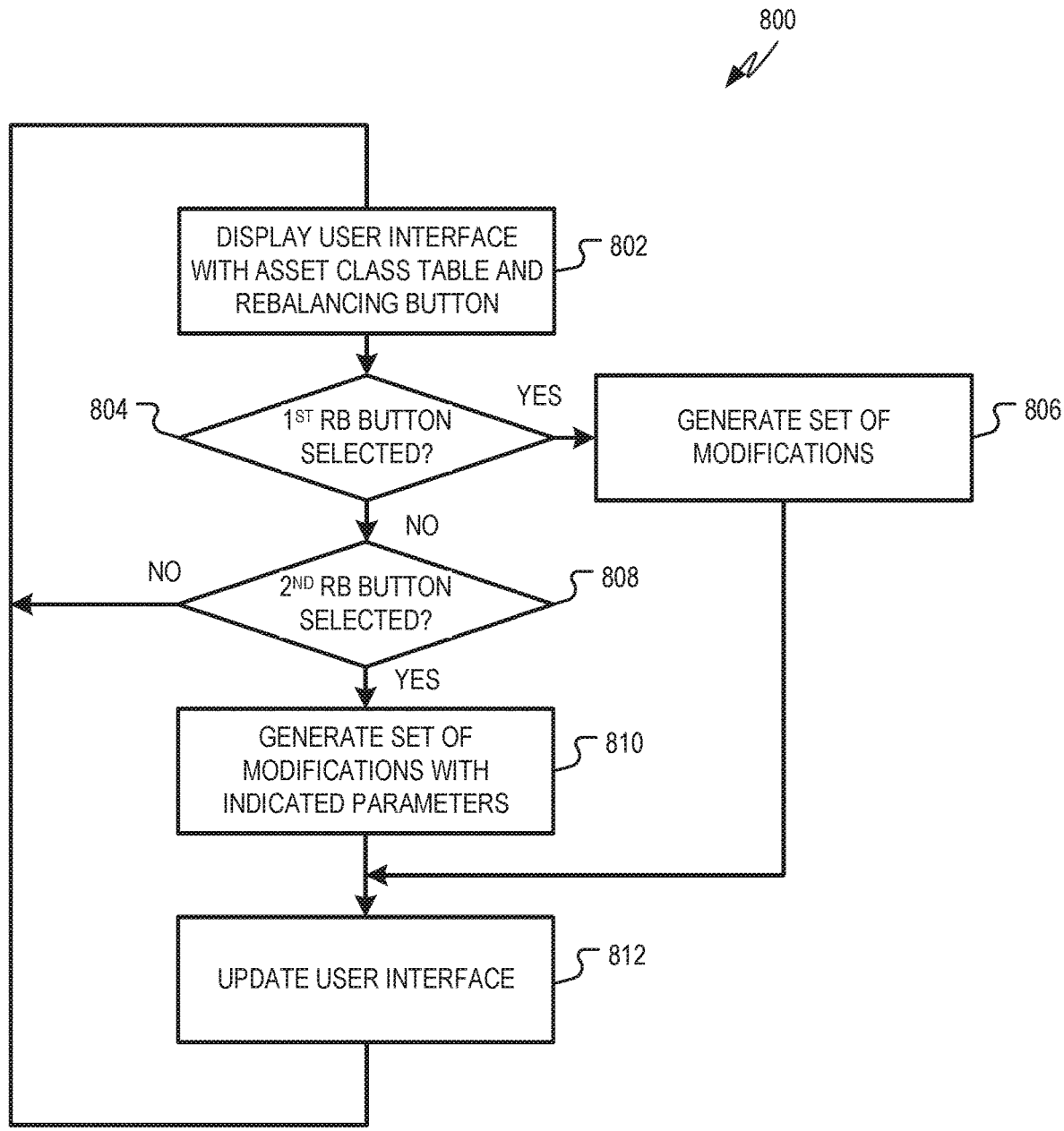
FIG. 8 is a flow chart showing one example of a process flow that may be executed by the portfolio management system in an example where the portfolio management user interface includes multiple rebalancing buttons.

FIG. 8 is a flow chart showing one example of a process flow 800 that may be executed by the portfolio management system 102 in an example where the portfolio management UI 104 includes multiple rebalancing buttons. At operation 802, the portfolio management system 102 may generate and display the portfolio management UI 104, for example, with an example of the asset class table (e.g., such as 126 or 301 described herein) along with two rebalance buttons. For example, the first rebalance button may be similar to the rebalance button 314 described herein and may prompt the portfolio management system 102 to generate a set of modifications according to a predetermined parameter (e.g., one sell and one buy transaction). The second rebalance button may prompt the portfolio management system 102 to generate a set of modifications according to a user-provided parameter or parameters, for example, similar to the rebalance button 316 and rebalancing parameter field 318.

At operation 804, the portfolio management system 102 may determine if the user 108 has selected the first rebalance button. If yes, then the portfolio management system 102 (e.g., the portfolio optimizer subsystem 110) may generate a set of modifications at operation 806. The portfolio management system 102 may update the portfolio management UI 104 in view of the set of modifications at operation 812 and continue to display the portfolio management UI 104 at operation 802. If the first rebalance button is not selected at operation 804, the portfolio management system 102 may determine, at operation 808, if the second rebalance button is selected by the user 108. If not, the portfolio management system 102 may continue to display the portfolio management UI 104 at operation 802.

If the user 108 has selected the second rebalance button, the portfolio management system 102 may generate a set of modifications in view of the user-provided parameter or parameters at operation 810. The portfolio management system 102 may update the portfolio management UI 104 in view of the determined set of modifications at operation 812.

Figure 9:
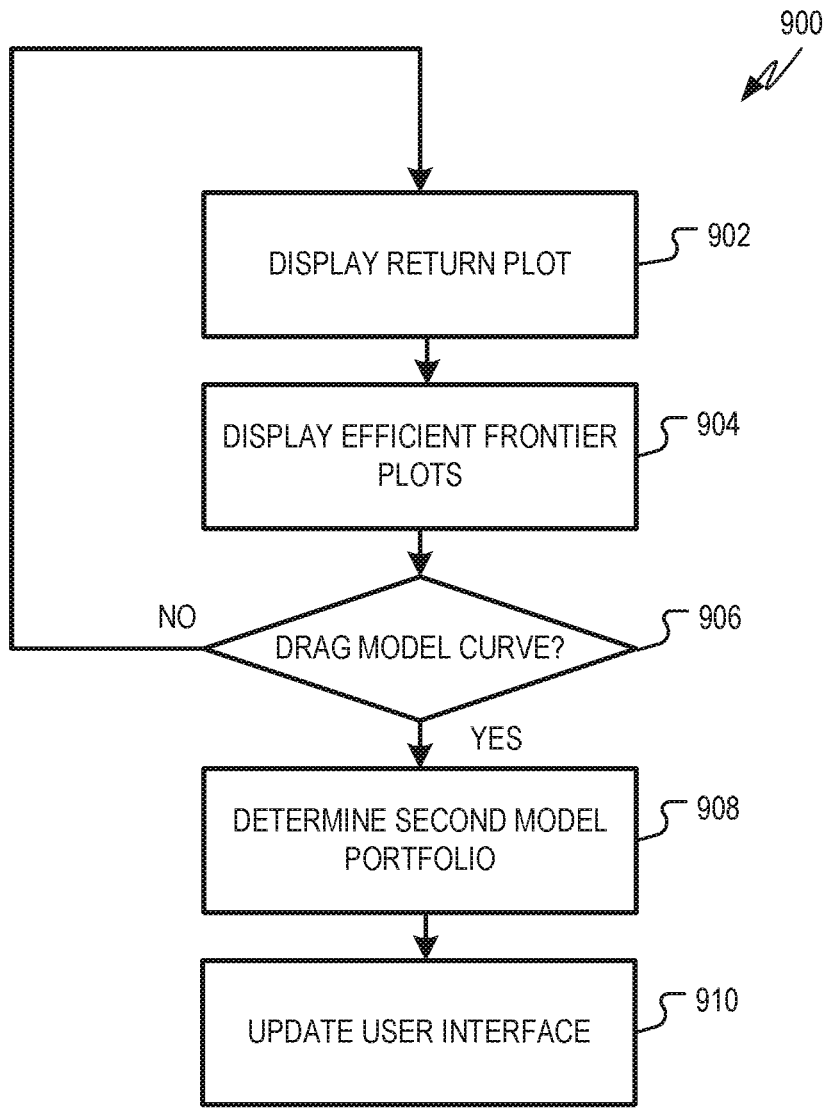
FIG. 9 is a flow chart showing one example of a process flow that may be executed by the portfolio management system, for example, to modify return and/or efficient frontier plots as described herein.

FIG. 9 is a flow chart showing one example of a process flow 900 that may be executed by the portfolio management system 102, for example, to modify return and/or efficient frontier plots as described herein. At operation 902, the portfolio management system 102 may display a return plot, for example, similar to the return plots 128, 604 described herein. The displayed return plot may include, for example, a model portfolio curve and may also include a test portfolio curve, a downside curve, etc. At optional operation 904, the portfolio management system 102 may display one or more efficient frontier plots, for example, similar to the efficient frontier plot 606 described herein.

At operation 906, the portfolio management system 102 may determine if the user 108 has dragged the model portfolio curve to a new location on the return plot. If not, the portfolio management system 102 may continue to display the plots at operations 902 and 904. If the model portfolio curve has been dragged, the portfolio management system 102 (e.g., the portfolio optimizer subsystem 110) may select a second model portfolio at operation 908. The second model portfolio may be selected based on the position to which the user 108 has dragged the initial model portfolio curve. For example, the portfolio management system 102 may select a new investment objective having a return level that would place the test portfolio at the return level indicated by the position to which the user 108 has dragged the model portfolio curve. The new model portfolio may be a low risk or these lowest risk portfolio that can meet the indicated level of returns. At operation 910, the portfolio management system 102 (e.g., the tool generator subsystem 112) may update the portfolio management UI 104 in view of the newly selected model portfolio and investment objective.

Figure 10:
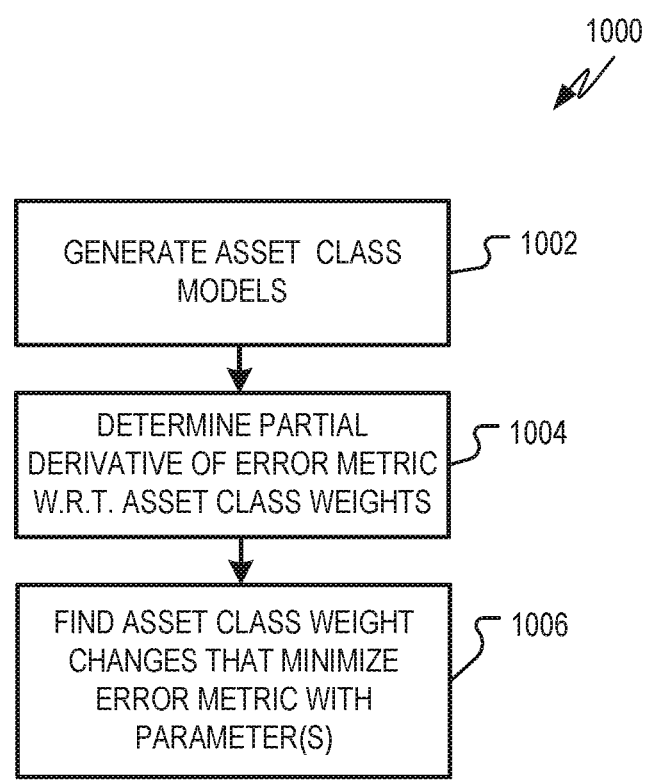
FIG. 10 is a flow chart showing one example of a process flow that may be executed by the portfolio management system to determine a set of modifications.

FIG. 10 is a flow chart showing one example of a process flow 1000 that may be executed by the portfolio management system 102 to determine a set of modifications. For example, the process flow 1000 shows one way that the portfolio management system 102 may execute the operations 706, 810 of FIGS. 7 and 8 respectively.

Referring again to FIG. 10, at operation 1002, the portfolio management system 102 (e.g., portfolio optimizer subsystem 110) may generate or receive asset class models for the various classes of financial assets that are or may be included in the test portfolio. In some examples, the models may be received from and/or generated from data received from the model system 118. In some examples, an asset class model for an asset class may be determined considering the expected returns of the asset class, a risk level of the asset class, and one or more correlations between the asset class and other asset classes. These values may be determined, based in part, upon capital market assumptions that may be generated, for example, by a research group or modeling group and received, for example, from the research system 122 and/or model system 118.

At operation 1004, the portfolio management system 102 (e.g., portfolio optimizer subsystem 110) may utilize the asset class models determined and/or received at operation

1002 to generate partial derivatives of the error metric with respect to asset class weights. For example, the partial derivatives of the error metric with respect to asset class weights may describe how changes in the asset class weights affect the error metric.

At operation 1006, the portfolio management system 102 (e.g., portfolio optimizer subsystem 110) may utilize the partial derivatives determined at operation 1004 to find a set of asset class weight modifications that minimize the error metric with respect to one or more rebalancing parameters. Any suitable optimization method may be used such as, for example, an iterative technique such as gradient descent. According to a gradient descent method, the portfolio management system 102 (e.g., portfolio optimizer subsystem 110) may select a first modification or set of modifications, for example, based on the partial derivatives found at operation 1004. For example, if the partial derivative of the error metric with respect to a particular asset class indicates that an increase in that asset class weight will lead to a decrease in the error metric, then the portfolio management system 102 (e.g., portfolio optimizer subsystem 110) may select an increase in the asset class weight of that asset class and a decrease in the asset class weight of another class. The process may continue until further changes lead to an increase of the error metric.

Figure 11:
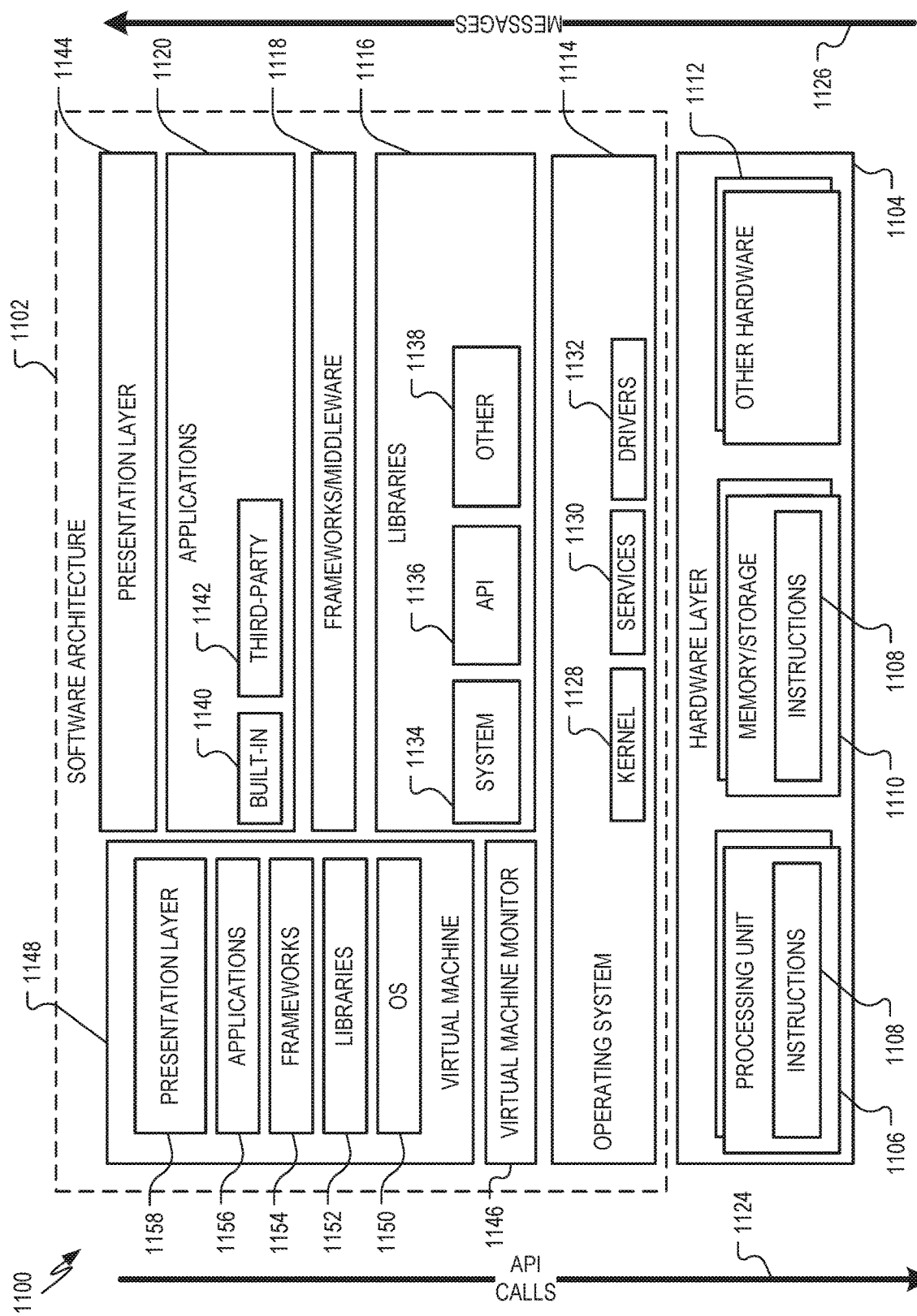
FIG. 11 is a block diagram showing one example of a software architecture for a computing device.

FIG. 11 is a block diagram 1100 showing one example of a software architecture 1102 for a computing device. The architecture 1102 maybe used in conjunction with various hardware architectures, for example, as described herein. FIG. 11 is merely a non-limiting example of a software architecture 1102 and many other architectures may be implemented to facilitate the functionality described herein. The software architecture 1102 may be executed on hardware such as, for example, any of the systems or subsystems described herein. A representative hardware layer 1104 is illustrated and can represent, for example, any of the above referenced computing devices. In some examples, the hardware layer 1104 may be implemented according to the architecture 1102 of FIG. 11 and/or the architecture 1200 of FIG. 12.

The representative hardware layer 1104 comprises one or more processing units 1106 having associated executable instructions 1108. Executable instructions 1108 represent the executable instructions of the software architecture 1102, including implementation of the methods, systems, components, and so forth of FIGS. 1-10. Hardware layer 1104 also includes memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of hardware architecture 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of a hardware or software interrupt and, in response, cause the architecture 1102 to pause its current processing and execute an interrupt service routine (ISR) when an interrupt is received. The ISR may generate the alert, for example, as described herein.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built-in applications 1140 as well as a broad assortment of other applications. In a specific example, the third-party, application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built-in operating system functions (e.g., kernel 1128, services 1130 and/or drivers 1132), libraries (e.g., system libraries 1134, API libraries 1136, and other libraries 1138), frameworks/middleware 1118 to create user interfaces to interact with users of the system. Alternatively, or additionally, in some systems, interactions with a user may occur through a presentation layer, such as presentation layer 1144. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 11, this is illustrated by virtual machine 1148. A virtual machine creates a software environment where applications/modules can execute as if they were executing on a hardware computing device. A virtual machine 1148 is hosted by a host operating system (operating system 1114) and typically, although not always, has a virtual machine monitor 1146, which manages the operation of the virtual machine 1148 as well as the interface with the host operating system (i.e., operating system 1114). A software architecture executes within the virtual machine 1148 such as an operating system 1150, libraries 1152, frameworks/middleware 1154, applications 1156 and/or presentation layer 1158. These layers of software architecture executing within the virtual machine 1148 can be the same as corresponding layers previously described or may be different.

Figure 12:
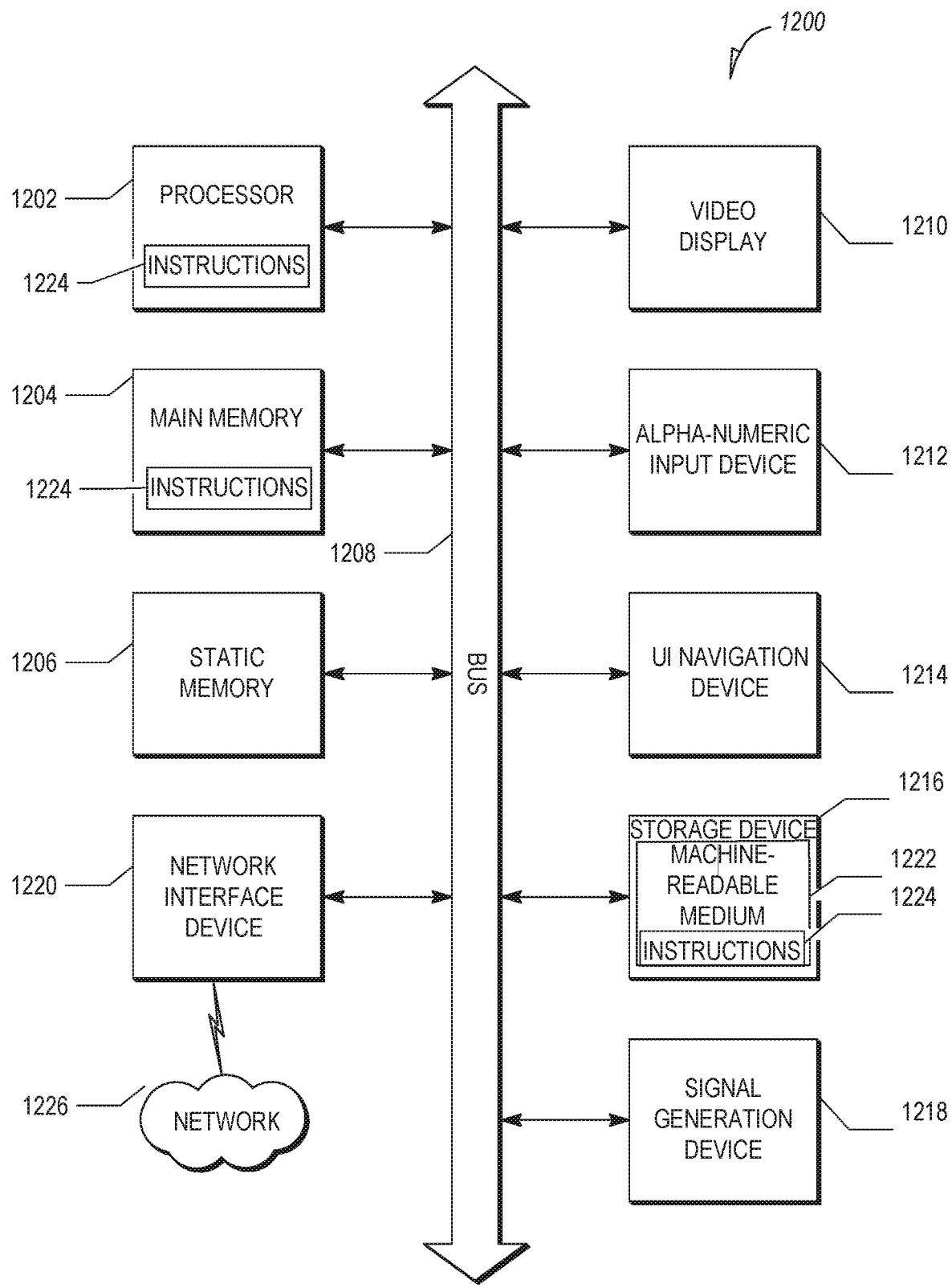
FIG. 12 is a block diagram illustrating a computing device hardware architecture, within which a set or sequence of instructions can be executed to cause the machine to perform examples of any one of the methodologies discussed herein.

FIG. 12 is a block diagram illustrating a computing device hardware architecture 1200, within which a set or sequence of instructions can be executed to cause the machine to perform examples of any one of the methodologies discussed herein. For example, the architecture 1200 may execute the software architecture 1102 described with respect to FIG. 11. The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 1200 includes a processor unit 1202 comprising at least one processor (e.g., a central processing unit (CPU), a graphics processing unit (GPU) or both, processor cores, compute nodes, etc.). The architecture 1200 may further comprise a main memory 1204 and a static memory 1206, which communicate with each other via a link 1208 (e.g., bus). The architecture 1200 can further include a video display unit 1210, an alphanumeric input device 1212 (e.g., a keyboard), and a user interface (UI) navigation device 1214 (e.g., a mouse). In some examples, the video display unit 1210, input device 1212 and UI navigation device 1214 are incorporated into a touch screen display. The architecture 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, or other sensor.

In some examples, the processor unit 1202 or other suitable hardware component may support a hardware interrupt. In response to a hardware interrupt, the processor unit 1202 may pause its processing and execute an interrupt service routine (ISR), for example, as described herein.

The storage device 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204, static memory 1206, and/or within the processor unit 1202 during execution thereof by the architecture 1200, with the main memory 1204, static memory 1206, and the processor unit 1202 also constituting machine-readable media. Instructions 1224 stored at the machine-readable medium 1222 may include, for example, instructions for implementing the software architecture 1102, instructions for executing any of the features described herein, etc.

While the machine-readable medium 1222 is illustrated in an example to be a single medium, the term "machine-readable medium" can include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 can further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions (e.g., instructions 1224) for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:
    a computing device comprising a processor unit programmed to perform operations comprising:
    serving a portfolio management user interface screen to a user of the computing device, the portfolio management user interface screen comprising:
        a first axis indicating time;
        a second axis indicating portfolio size;
        a first curve plotted on the first axis and the second axis, the first curve indicating a portfolio size over time for a first model portfolio;
        a second curve plotted on the first axis and the second axis, the second curve indicating a portfolio size over time for a test portfolio; and
        a rebalance button;
    receiving, from the user, an instruction to drag the first curve, the instruction describing a size of the drag and a direction of the drag;
    selecting a second model portfolio based at least in part on the size of the drag and the direction of the drag;
    modifying the portfolio management user interface screen to include a third curve plotted on the first axis and the second axis, the third curve indicating a portfolio size over time for the second model portfolio;
    receiving an indication that the user has selected the rebalance button;
    responsive to receiving the indication that the user has selected the rebalance button, generating a first set of modifications to the test portfolio to reduce a difference between the test portfolio and the second model portfolio; and
    displaying the first set of modifications to the test portfolio at the portfolio management user interface screen.

2. The system of claim 1, the portfolio management user interface screen further comprising:
    a first table comprising:
    an asset class name column;
    a model portfolio column indicating asset class weights in the second model portfolio;
    a modification column indicating the first set of modifications to the test portfolio;
    a modified portfolio column indicating asset class weights in a first modified portfolio; the first modified portfolio being based at least in part on the test portfolio and the first set of modifications to the test portfolio; and
    a plurality of rows comprising a first row for a first asset class indicated by the asset class name column and a second row for a second asset class indicated by the asset class name column.

3. The system of claim 2, the processor unit being further programmed to perform operations comprising:
    displaying an error metric field showing an error metric indicating a difference between the test portfolio and the second model portfolio; and
    displaying a modified error metric field showing an error metric indicating a difference between the first modified portfolio and the second model portfolio.

4. The system of claim 2, the processor unit being further programmed to perform operations comprising:
    updating the first row to indicate a modification of the first set of modifications
    populating a modification field of the first row with a change to an asset class weight of the first asset class; and
    populating a modified portfolio field of the first row with an indication of an asset class weight of the first modified portfolio based at least in part on the asset class weight change.

5. The system of claim 1, the first set of modifications comprising a plurality of changes to asset class weights of the test portfolio to reduce a difference between the test portfolio and the second model portfolio, wherein the first set of modifications comprises a positive modification to a first asset class weight and a negative modification to a second asset class weight.

6. The system of claim 1, wherein the first set of modifications is to reduce an error metric describing the difference between the test portfolio and the second model portfolio.

7. The system of claim 1, the processor unit being further programmed to perform operations comprising:
    generating a first modified portfolio at least in part by applying the first set of modifications to the test portfolio;
    receiving an indication that the user has again selected the rebalance button; and
    generating a second set of modifications to further reduce a difference between the first modified portfolio and the second model portfolio; and
    generating a second modified portfolio using the first modified portfolio and the second set of modifications, an error metric indicating a difference between the second model portfolio and the second modified portfolio being less than an error metric indicating a difference between the second model portfolio and the first modified portfolio.

8. The system of claim 1, wherein the portfolio management user interface screen comprises a second rebalance button, and wherein the processor unit is further programmed to perform operations comprising:

receiving an indication that the user selected the second rebalance button; and generating a second set of modifications to reduce a difference between the test portfolio and the second model portfolio, wherein the second set of modifications comprises more modifications than the first set of modifications.

9. The system of claim 8, the processor unit being further programmed to perform operations comprising:

receiving a second rebalance parameter indicating a parameter of the second set of modifications, wherein the generating of the second set of modifications is based at least in part on the parameter.

10. The system of claim 1; wherein the portfolio management user interface screen comprises a second result field comprising:

a third axis indicating risk;
a fourth axis indicating returns;
a first curve plotted on the third axis and the fourth axis indicating an efficient frontier;
a first indicator plotted on the third axis and the fourth axis indicating the second model portfolio; and
a second indicator plotted on the third axis and the fourth axis indicating the test portfolio.

11. A method comprising:

serving to a user a portfolio management user interface screen comprising:
a first axis indicating time;
a second axis indicating portfolio size; and
a first curve plotted on the first axis and the second axis, the first curve indicating a portfolio size over time for a first model portfolio;
a second curve plotted on the first axis and the second axis, the second curve indicating a portfolio size over time for a test portfolio;
a rebalance button;

receiving, from the user, an instruction to drag the first curve, the instruction describing a size of the drag and a direction of the drag;

selecting a second model portfolio based at least in part on the size of the drag and the direction of the drag;

modifying the portfolio management user interface screen to include a third curve plotted on the first axis and the second axis, the third curve indicating a portfolio size over time for the second model portfolio;

receiving an indication that the user has selected the rebalance button;

responsive to receiving the indication that the user has selected the rebalance button, generating a first set of modifications to the test portfolio to reduce a difference between the test portfolio and the second model portfolio; and displaying the first set of modifications to the test portfolio at the portfolio management user interface screen.

12. The method of claim 11, the portfolio management user interface screen further comprising:

a first table comprising:
an asset class name column;
a model portfolio column indicating asset class weights in the second model portfolio;
a modification column indicating the first set of modifications to the test portfolio;
a modified portfolio column indicating asset class weights in a first modified portfolio, the first modified portfolio being based at least in part on the test portfolio and the modifications to the test portfolio; and a plurality of rows comprising a first row for a first asset class indicated by the asset class name column and a second row for a second asset class indicated by the asset class name column.

13. The method of claim 12, further comprising displaying an error metric field showing an error metric indicating a difference between the test portfolio and the second model portfolio; and displaying a modified error metric field showing an error metric indicating a difference between the first modified portfolio and the second model portfolio.

14. The method of claim 12, further comprising updating the first row to indicate a modification of the first set of modifications populating a modification field of the first row with a change to an asset class weight of the first asset class; and populating a modified portfolio field of the first row with an indication of an asset class weight of the first modified portfolio based at least in part on the asset class weight change.

15. The method of claim 11, the first set of modifications comprising a plurality of changes to asset class weights of the test portfolio to reduce a difference between the test portfolio and the second model portfolio, wherein the first set of modifications comprises a positive modification to a first asset class weight and a negative modification to a second asset class weight.

16. The method of claim 11, wherein the first set of modifications is to reduce an error metric describing the difference between the test portfolio and the second model portfolio.

17. The method of claim 11, further comprising:

generating a first modified portfolio at least in part by applying the first set of modifications to the test portfolio;

receiving an indication that the user has again selected the rebalance button; and generating a second set of modifications to further reduce a difference between the first modified portfolio and the second model portfolio; and generating a second modified portfolio using the first modified portfolio and the second set of modifications, an error metric indicating a difference between the second model portfolio and the second modified portfolio being less than an error metric indicating a difference between the second model portfolio and the first modified portfolio.

18. The method of claim 11, wherein the portfolio management user interface screen comprises a second rebalance button further comprising:

receiving an indication that the user selected the second rebalance button; and generating a second set of modifications to reduce a difference between the test portfolio and the second model portfolio, wherein the second set of modifications comprises more modifications than the first set of modifications.

19. The method of claim 18, further comprising receiving a second rebalance parameter indicating a parameter of the second set of modifications, wherein the generating of the second set of modifications is based at least in part on the parameter.

20. A non-transitory machine-readable medium comprising instructions thereon that, when executed by a processor unit, causes the processor unit to perform operations comprising:

serving to a user a portfolio management user interface screen comprising:
- a first axis indicating time;
- a second axis indicating portfolio size; and
- a first curve plotted on the first axis and the second axis, the first curve indicating a portfolio size over time for a first model portfolio;
- a second curve plotted on the first axis and the second axis, the second curve indicating a portfolio size over time for a test portfolio;
- a rebalance button;

receiving, from the user, an instruction to drag the first curve, the instruction describing a size of the drag and a direction of the drag;

selecting a second model portfolio based at least in part on the size of the drag and the direction of the drag;

modifying the portfolio management user interface screen to include a third curve plotted on the first axis and the second axis, the third curve indicating a portfolio size over time for the second model portfolio;

receiving an indication that the user has selected the rebalance button;

responsive to receiving the indication that the user has selected the rebalance button, generating a first set of modifications to the test portfolio to reduce a difference between the test portfolio and the second model portfolio; and displaying the first set of modifications to the test portfolio at the portfolio management user interface screen.

* * * * *

UNITED STATES PATENT AND TRADEMARK OFFICE
CERTIFICATE OF CORRECTION

PATENT NO. : 11,704,736 B1
APPLICATION NO. : 17/302891
DATED : July 18, 2023
INVENTOR(S) : Krieger et al.

It is certified that error appears in the above-identified patent and that said Letters Patent is hereby corrected as shown below:

In the Claims

Column 18, Line 10, Claim 2, delete "portfolio;" and insert --portfolio,-- therefor Column 18, Line 28, Claim 4, after "modifications", insert --;--

Column 19, Line 14, Claim 10, delete "claim 1:" and insert --claim 1,-- therefor Column 20, Line 5, Claim 13, after "comprising", insert --:--

Column 20, Line 12, Claim 14, after "comprising", insert --:--

Column 20, Line 14, Claim 14, after "modifications", insert --;--

Signed and Sealed this
Tenth Day of October, 2023

Katherine Kelly Vidal
*Director of the United States Patent and Trademark Office*